US011876251B2

(12) United States Patent
Nishimura et al.

(10) Patent No.: US 11,876,251 B2
(45) Date of Patent: Jan. 16, 2024

(54) ENERGY STORAGE APPARATUS

(71) Applicant: GS Yuasa International Ltd., Kyoto (JP)

(72) Inventors: Yosuke Nishimura, Kyoto (JP); Nobuyuki Naganawa, Kyoto (JP); Kenta Yoshioka, Kyoto (JP); Yoshimasa Toshioka, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 482 days.

(21) Appl. No.: 17/252,016

(22) PCT Filed: Jun. 21, 2019

(86) PCT No.: PCT/JP2019/024701
§ 371 (c)(1),
(2) Date: Dec. 14, 2020

(87) PCT Pub. No.: WO2019/245029
PCT Pub. Date: Dec. 26, 2019

(65) Prior Publication Data
US 2021/0265691 A1 Aug. 26, 2021

(30) Foreign Application Priority Data
Jun. 22, 2018 (JP) ................................ 2018-118854

(51) Int. Cl.
*H01M 50/593* (2021.01)
*H01M 50/209* (2021.01)

(52) U.S. Cl.
CPC ....... *H01M 50/593* (2021.01); *H01M 50/209* (2021.01)

(58) Field of Classification Search
None
See application file for complete search history.

(56) References Cited

U.S. PATENT DOCUMENTS

| 2011/0262797 A1 | 10/2011 | Kim |
| 2015/0064541 A1 | 3/2015 | Noh et al. |
| 2016/0190526 A1 | 6/2016 | Yamada et al. |

(Continued)

FOREIGN PATENT DOCUMENTS

| JP | 2009-087773 A | 4/2009 |
| JP | 2009-170258 A | 7/2009 |

(Continued)

OTHER PUBLICATIONS

International Search Report (ISR) (PCT Form PCT/ISA/210), in PCT/JP2019/024701, dated Sep. 24, 2019.

*Primary Examiner* — Wyatt P McConnell
(74) *Attorney, Agent, or Firm* — MCGINN I.P. LAW GROUP, PLLC

(57) ABSTRACT

In an embodiment, an energy storage apparatus includes plural energy storage devices arranged in a first direction, and a frame arranged along the energy storage devices. Each of the energy storage devices has an outer surface facing in a second direction orthogonal to the first direction. The frame has a first portion extending in the first direction along the outer surface, and a second portion extending in the second direction toward a facing surface on which the energy storage apparatus is installed, from at least a part of the first portion.

20 Claims, 8 Drawing Sheets

(56) References Cited

U.S. PATENT DOCUMENTS

| | | |
|---|---|---|
| 2016/0359152 A1 | 12/2016 | Nakayama |
| 2017/0365827 A1* | 12/2017 | Okada ................... H01M 50/50 |
| 2018/0019456 A1 | 1/2018 | Nakayama |
| 2018/0375075 A1 | 12/2018 | Yoshimura et al. |

FOREIGN PATENT DOCUMENTS

| | | | |
|---|---|---|---|
| JP | 2011-228306 A | 11/2011 | |
| JP | 2015-046379 A | 3/2015 | |
| JP | 2016-122572 A | 7/2016 | |
| JP | 2017-004604 A | 1/2017 | |
| JP | 6310990 B1 | 4/2018 | |
| WO | WO-2016157268 A1 * | 10/2016 | .............. H01M 2/10 |
| WO | WO 2017/104535 A1 | 6/2017 | |

* cited by examiner

ENERGY STORAGE APPARATUS

TECHNICAL FIELD

The present invention relates to an energy storage apparatus including plural energy storage devices arranged in a predetermined direction and a frame arranged along the plural energy storage devices.

BACKGROUND ART

Conventionally, a battery system including plural energy storage devices arranged in a predetermined direction and a frame arranged along the plural energy storage devices has been known (see Patent Document 1, for example). Specifically, as shown in FIG. 8, this battery system includes plural stacked battery cells 102, a pair of end plates 140 arranged at both ends of the plural battery cells 102, and connecting bars 143 arranged on both side surfaces of the plural battery cells 102. The connecting bar 143 has a strip shape, and bent pieces provided by bending both ends thereof in the stacking direction of the battery cell 102 inward are fixed to the end plates 140. As a result, the plural battery cells 102 are fixed in the stacked state.

Incidentally, when installing a battery system (energy storage apparatus), if both ends of the battery system (energy storage apparatus) are fixed in a state where the battery cell 102 is separated from a facing surface facing a bottom surface of the battery cell 102, a central portion of the battery system located between the ends may sink compared to the ends of the battery system, that is, the battery system may sag.

PRIOR ART DOCUMENT

Patent Document

Patent Document 1: JP-A-2009-170258

SUMMARY OF THE INVENTION

Problem to be Solved by the Invention

Hence, an object of the present embodiment is to provide an energy storage apparatus that is less likely to sag even when an energy storage apparatus including plural energy storage devices is installed such that both ends of the energy storage apparatus are fixed with the energy storage devices spaced apart from a facing surface facing outer surfaces of the energy storage devices that face a direction orthogonal to the arrangement direction of the energy storage devices.

Means for Solving the Problem

An energy storage apparatus of an embodiment includes plural energy storage devices arranged in a first direction, and a frame arranged along the plural energy storage devices. Each of the plural energy storage devices has an outer surface facing in a second direction orthogonal to the first direction. The frame has a first portion extending in the first direction along the outer surface, and a second portion extending in the second direction toward a facing surface on which the energy storage apparatus is installed, from at least a part of the first portion.

MODE FOR CARRYING OUT THE INVENTION

Figure 1:
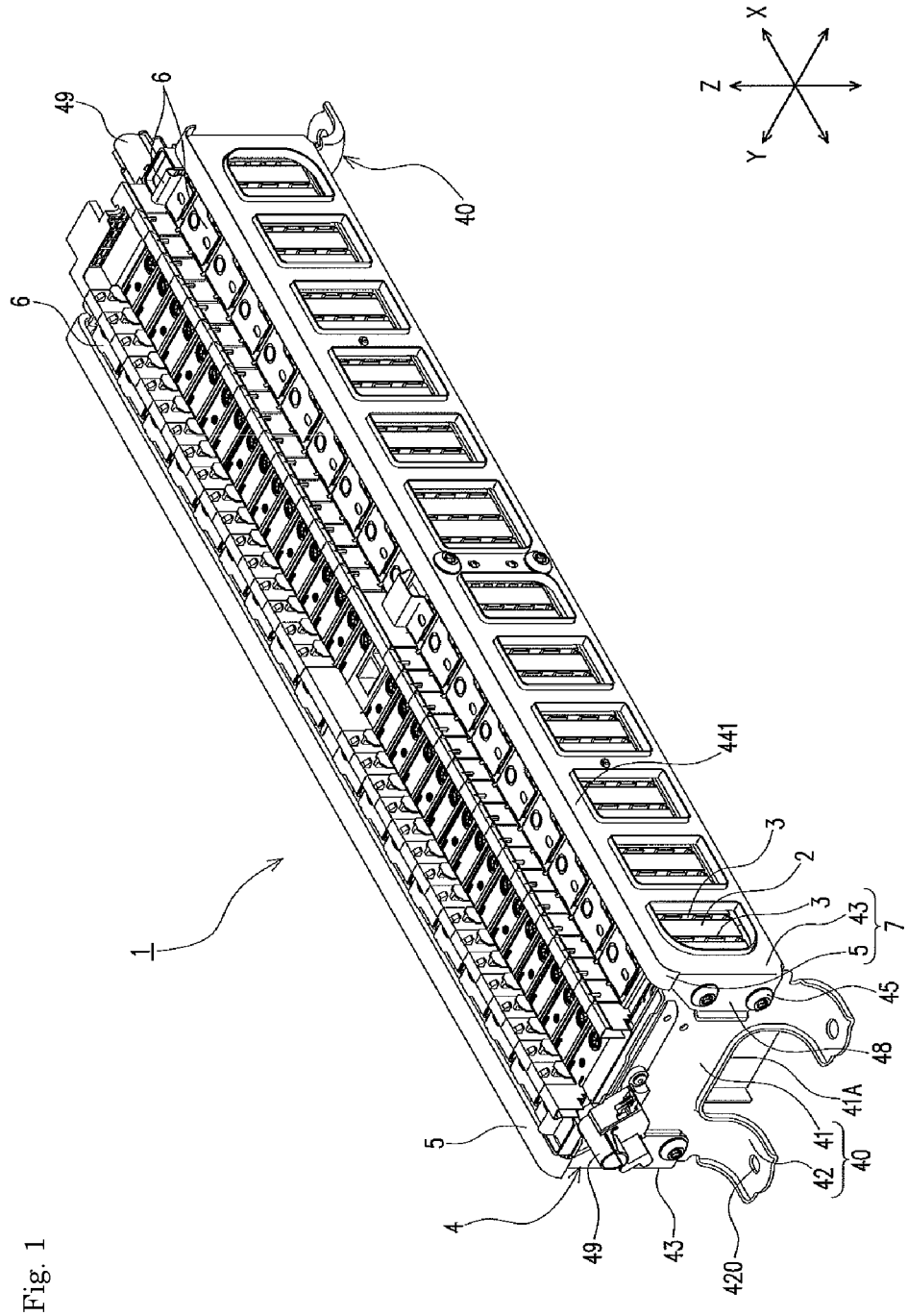
FIG. 1 is a perspective view of an energy storage apparatus according to an embodiment.

An energy storage apparatus of an embodiment includes plural energy storage devices arranged in a first direction, and a frame arranged along the plural energy storage devices. Each of the plural energy storage devices has an outer surface facing in a second direction orthogonal to the first direction. The frame has a first portion extending in the first direction along the outer surface, and a second portion extending in the second direction toward a facing surface on which the energy storage apparatus is installed, from at least a part of the first portion.

According to such a configuration, when the energy storage apparatus is installed, the second portion extends from the first portion toward the facing surface, which the outer surface of the energy storage device faces at a distance, so that the second portion comes into contact with the facing surface and supports the energy storage apparatus when the energy storage apparatus sags or starts to sag. Thus, sagging of the energy storage apparatus can be reduced. That is, the energy storage apparatus is less likely to sag.

In the energy storage apparatus, the second portion may extend toward the facing surface in the second direction from an entire area in the first direction of the first portion.

According to such a configuration, since the second portion can support the energy storage apparatus in a wide range in the first direction, the energy storage apparatus is even less likely to sag. Furthermore, since the second portion extending in the direction orthogonal to the first direction (second direction) is continuous in the entire area in the first direction of the first portion extending in the first direction, rigidity of the frame can be ensured and the energy storage apparatus is even less likely to sag.

In the energy storage apparatus, a pair of the frames may be provided so as to be arranged in a third direction orthogonal to the first direction and the second direction.

According to such a configuration, since the pair of frames are provided so as to be arranged in the third direction, the second portion supports the energy storage apparatus at plural locations spaced apart in the third direction. Hence, it is possible to suppress rattling and shaking of the energy storage apparatus along a plane orthogonal to the first direction of the energy storage device.

The energy storage apparatus may further include an end member that is outwardly aligned with an energy storage device located at a very end of the plural energy storage devices in the first direction, and the end member may have a main body portion facing the energy storage device located at the very end when viewed in the first direction, and an extension portion extending in the second direction to at least a tip end of the second portion from the main body portion.

According to such a configuration, by fixing the extension portion of the end member to a predetermined surface, the energy storage apparatus can be fixed in a state where the energy storage devices are spaced apart from the facing surface. That is, without using additional members or the like, the energy storage apparatus alone can be installed (fixed) with the energy storage devices spaced apart from the facing surface.

In the energy storage apparatus, the frame may include a conductive connecting member and an insulator, and the insulator may be arranged between the plural energy storage devices and the connecting member.

According to such a configuration, insulation can be achieved by arranging an insulator between the energy storage device and the conductive connecting member.

According to the present embodiment, it is possible to provide an energy storage apparatus that is less likely to sag even when an energy storage apparatus including plural energy storage devices is installed, and both ends of the energy storage apparatus are fixed with the energy storage devices spaced apart from a facing surface, which faces outer surfaces of the energy storage devices facing in a direction orthogonal to the arrangement direction of the energy storage devices.

Hereinafter, an embodiment of the present invention will be described with reference to FIGS. 1 to 5. Note that the names of the components (constituent elements) of the present embodiment are for the present embodiment, and may differ from the names of the components (constituent elements) in the background art.

Figure 2:
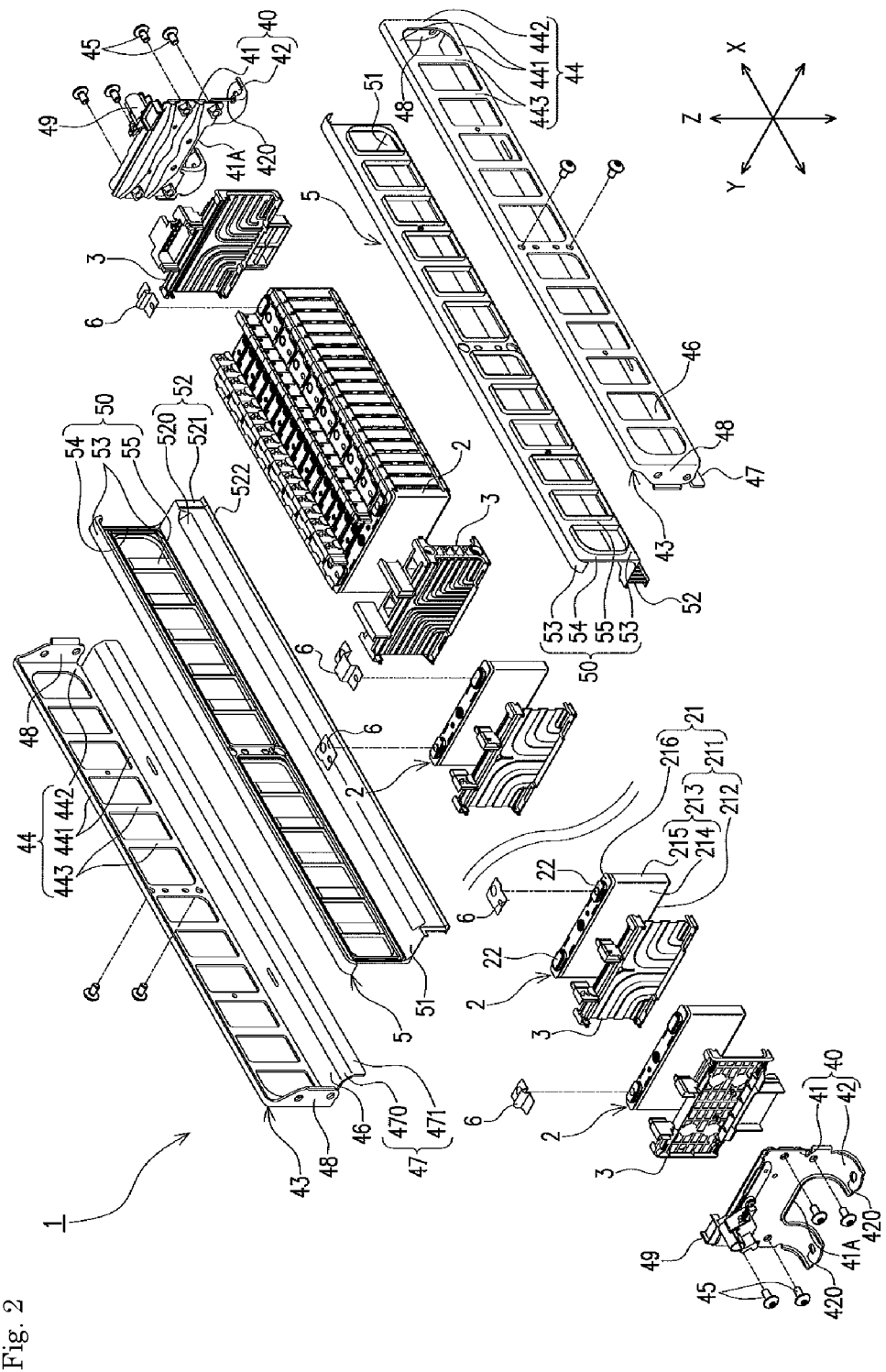
FIG. 2 is an exploded perspective view of the energy storage apparatus.

As shown in FIGS. 1 and 2, an energy storage apparatus includes plural energy storage devices 2 arranged in a predetermined direction, and frames 7 arranged along the plural energy storage devices 2. An energy storage apparatus 1 of the present embodiment includes adjacent members 3 adjacent to the energy storage devices 2 in the predetermined direction, a pair of end members 40 arranged on both sides of the plural energy storage devices 2, bus bars 6 that enable conduction between different energy storage devices 2, and an external input/output terminal 49 for input and output of the plural energy storage devices 2. Note that the frames 7 of the present embodiment, together with the pair of end members 40, form a holding member 4 that holds the plural energy storage devices 2.

Each of the plural energy storage devices 2 may be a primary battery, a secondary battery, a capacitor, or the like. The energy storage device 2 of the present embodiment is a nonaqueous electrolyte secondary battery that can be charged and discharged. More specifically, the energy storage device 2 is a lithium ion secondary battery that utilizes electron transfer caused by the movement of lithium ions. The energy storage device 2 is a so-called prismatic lithium ion secondary battery.

Each of the plural energy storage devices 2 has an electrode assembly, a case 21 that accommodates the electrode assembly together with an electrolyte solution, and an external terminal 22 at least partially exposed to the outside of the case 21 (see FIG. 2).

The case 21 has a case main body 211 having an opening, and a plate-shaped lid plate 216 that closes the opening of the case main body 211. The case main body 211 of the present embodiment has a bottomed square tube shape, and the case 21 has a flat rectangular parallelepiped shape. The case main body 211 includes a rectangular plate-shaped closing portion 212 and a tubular body portion (peripheral wall) 213 connected to the peripheral edge of the closing portion 212. The body portion 213 has a flat square tubular shape. The body portion 213 has a pair of long wall portions 214 extending from the long side at the peripheral edge of the closing portion 212, and a pair of short wall portions 215 extending from the short side at the peripheral edge of the closing portion 212. By connecting corresponding end portions of the pair of long wall portions 214 to each other by the short wall portion 215, the flat square tubular body portion 213 is formed. The lid plate 216 is a rectangular plate-shaped member that closes the opening of the case main body 211. A pair of the external terminals 22 are spaced apart on the lid plate 216.

In the energy storage apparatus 1 of the present embodiment, the plural energy storage devices 2 are arranged in a state where the long wall portions 214 of the cases 21 (case main bodies 211) face each other.

In the following, a predetermined direction (first direction) in which the plural energy storage devices 2 are arranged is the X axis of the Cartesian coordinate system, and a direction (third direction) in which the short wall portion 215 of the case main body 211 faces is the Y axis of the Cartesian coordinate system, and a direction (second direction) in which an outer surface of the closing portion 212 faces is the Z axis of the Cartesian coordinate system.

Figure 3:
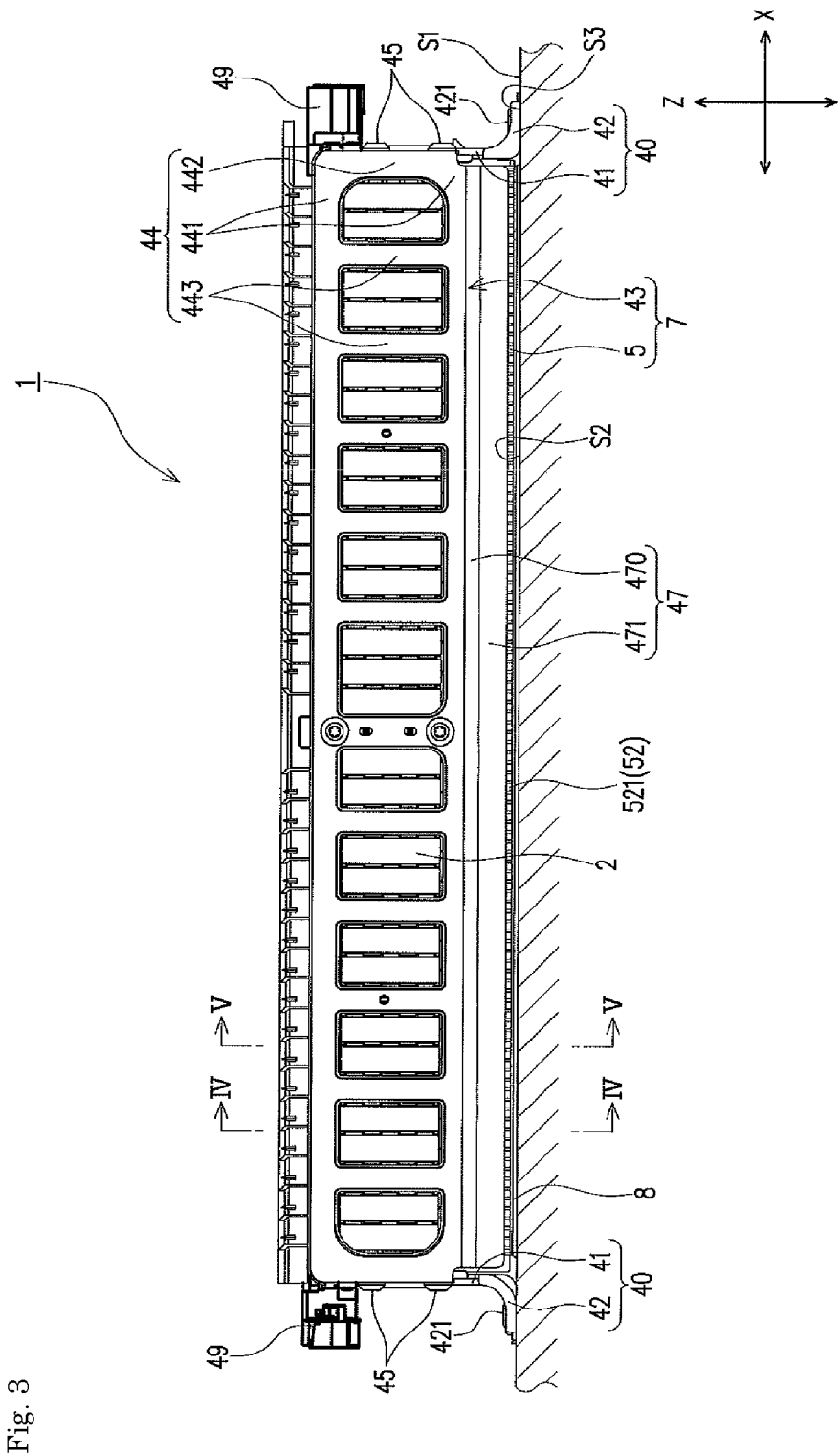
FIG. 3 is a side view describing a state in which the energy storage apparatus is arranged on an installation surface.
Figure 4:
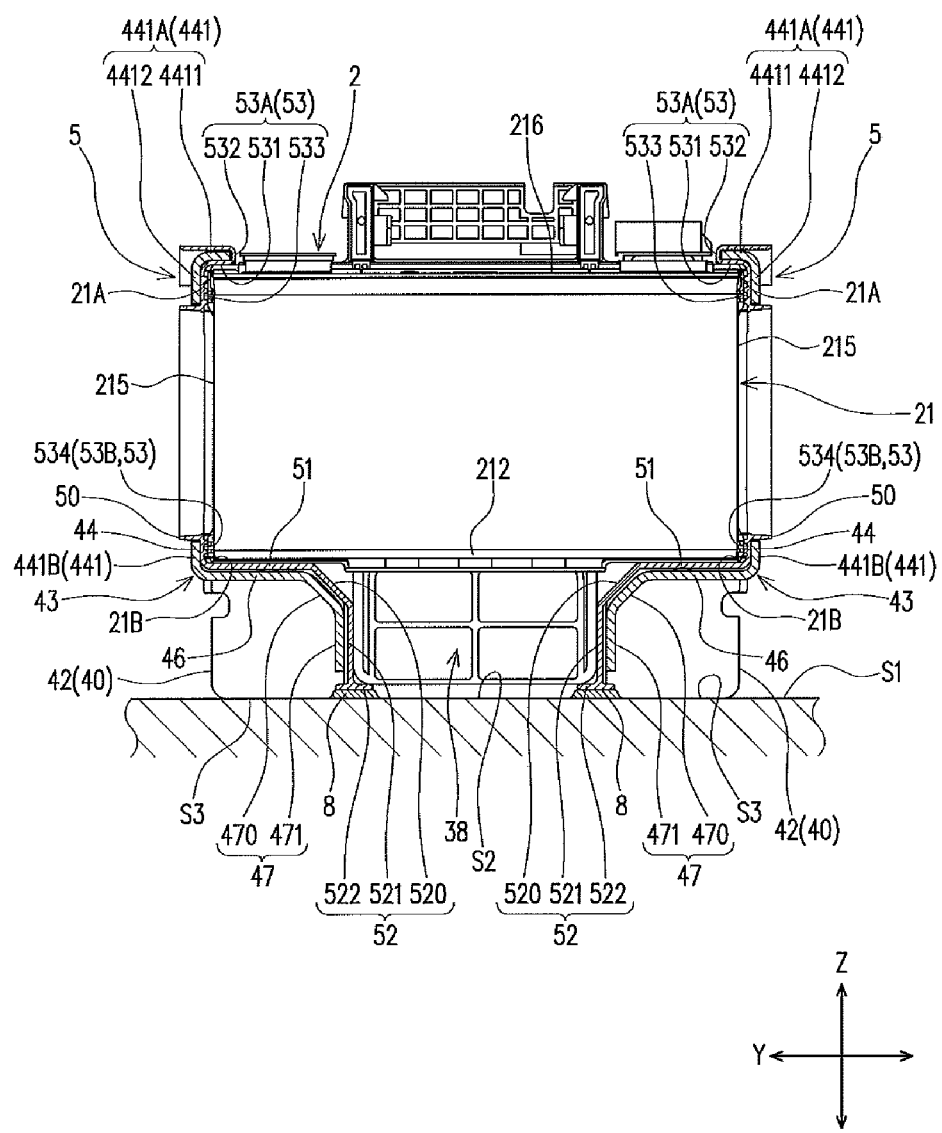
FIG. 4 is a cross-sectional view taken along line IV-IV of FIG. 3.
Figure 5:
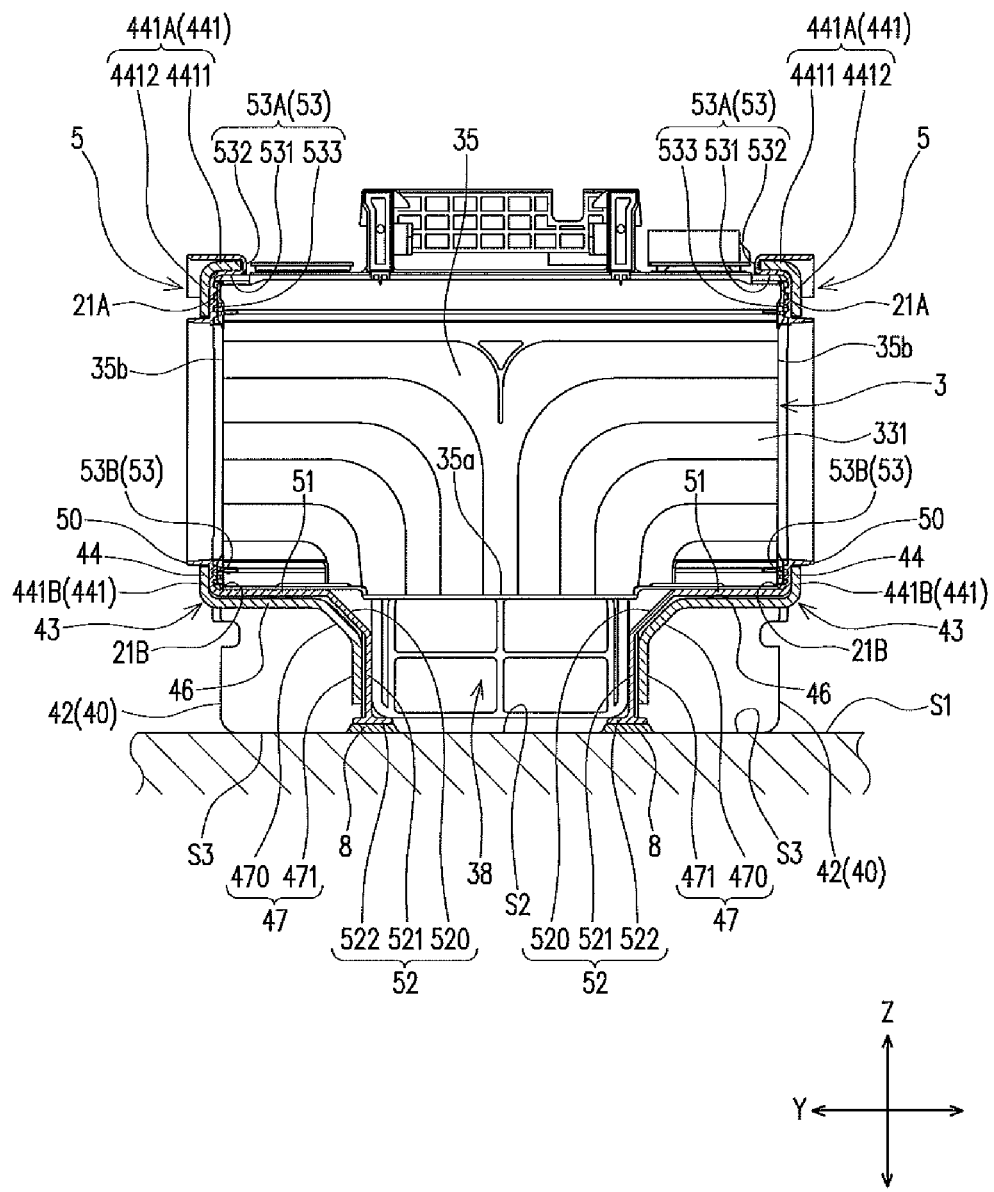
FIG. 5 is a cross-sectional view taken along line V-V of FIG. 3.

Additionally, the energy storage apparatus 1 of the present embodiment is installed on an installation surface S1 as shown in FIGS. 3 to 5. The installation surface S1 of the present embodiment includes, in a state where the energy storage apparatus 1 is installed on the installation surface S1, a facing region (facing surface) S2 that outer surfaces (e.g., outer surfaces of closing portions 212) of the plural energy storage devices 2 face at a distance, and installation regions S3 to which both ends of the energy storage apparatus 1 in the X-axis direction are fixed. The installation surface S1 of the present embodiment is a horizontal surface.

The adjacent member 3 is arranged between two energy storage devices 2 adjacent to each other in the X-axis direction (e.g., between each energy storage device 2), or between the energy storage device 2 at the very end in the X-axis direction and a member (part of holding member 4 in example of present embodiment) arranged next to the energy storage device 2 in the X-axis direction (see FIG. 2). The adjacent member 3 is formed of a member having an insulating property such as resin. Additionally, the adjacent member 3 forms plural flow paths 35 that allow passage of a fluid for adjusting the temperature of the energy storage device 2 between the adjacent member 3 and an adjacent energy storage device 2 (see FIG. 5). At least one of the plural flow paths 35 of the present embodiment extends from an opening (inlet) 35a formed at an end position on the other side of the adjacent member 3 in the Z-axis direction (position corresponding to closing portion 212 of energy storage device 2) to openings (outlets) 35b formed at end positions on one side and the other side of the adjacent member 3 in the Y-axis direction (positions corresponding to short wall portions 215 of energy storage device 2). This flow path 35 is curved at an intermediate position in the longitudinal direction.

The holding member 4 holds the plural energy storage devices 2 and the plural adjacent members 3 together by surrounding the periphery of the plural energy storage devices 2 and the plural adjacent members 3 (see FIG. 1). Additionally, the holding member 4 includes the pair of end members 40 arranged on both sides of the plural energy storage devices 2 in the X-axis direction, and frames 7 arranged along the X-axis direction.

Each of the pair of end members 40 is arranged so as to sandwich the adjacent member 3 between the end member 40 and the energy storage device 2 arranged at the end in the X-axis direction (see FIG. 2). In other words the end member 40 is aligned with the energy storage device 2 in the X-axis direction on the outside of the energy storage device 2 located at the very end of the plural energy storage devices 2. Each of the pair of end members 40 has an end member main body (main body portion) 41 that is a member spreading along the YZ plane (plane including Y-axis and Z-axis) and overlapping with the energy storage device 2 when viewed in the X-axis direction, and an extension portion (extension portion) 42 that extends from the end member main body 41.

The end member main body 41 is a portion facing the energy storage device 2 located at the very end when viewed in the X-axis direction. The end member main body 41 of the present embodiment is a portion in a rectangular shape corresponding to the energy storage device 2.

The extension portion 42 is a portion extending along the Z-axis direction from the end member main body 41. The extension portion 42 of the present embodiment is a portion extending along the Z-axis direction from a side 41A of the rectangular end member main body 41 corresponding to the closing portion 212 of the energy storage device 2, and extending such that its other side in the Z-axis direction spreads outward in the X-axis direction. Hence, the end edge of the extension portion 42 of the present embodiment located on the other side in the Z-axis direction is located on the other side in the Z-axis direction of the closing portion 212 of the energy storage device 2 (see FIGS. 3 to 5).

The end member 40 of the present embodiment has two extension portions 42 that are spaced apart in the Y-axis direction. Each of the two extension portions 42 has a hole 420 that penetrates the extension portion 42 in the Z-axis direction (see FIG. 1). For example, with a bolt 421 inserted through the hole 420, the bolt 421 is screwed into a screw hole provided in the installation region S3, so that each of the two extension portions 42 is fixed to the installation region S3. As a result, the energy storage apparatus 1 is fixed to the installation regions S3 in a state where both ends (end member main bodies 41) of the energy storage apparatus 1 in the X-axis direction are separated from the installation regions S3 in the Z-axis direction (see FIGS. 3 to 5).

The frame 7 includes, for example, a connecting member 43 arranged along the plural energy storage devices 2, and an insulator 5 arranged between the connecting member 43 and the plural energy storage devices 2 (see FIG. 1). In the frame 7 of the present embodiment, the material of the connecting member 43 is different from the material of the insulator 5. Additionally, in the frame 7 of the present embodiment, the connecting member 43 is separate from the insulator 5.

The connecting member 43 is formed of a conductive member such as a metal. The connecting member 43 of the present embodiment is separate from the end member 40, and is fixed (connected) to the end member 40 by a fixing member 45. In the energy storage apparatus 1 of the present embodiment, a pair of connecting members 43 are provided so as to be arranged in the Y-axis direction, and connect both end portions of the pair of end members 40 in the Y-axis direction.

The pair of connecting members 43 are arranged on both sides of the plural energy storage devices 2 in the Y-axis direction (see FIG. 2). Each of the pair of connecting members 43 is arranged along the plural energy storage devices 2. Additionally, each of the pair of connecting members 43 has a connecting member main body 44 extending in the X-axis direction along the short wall portion 215 of each of the plural energy storage devices 2, a first extension portion 46 extending along the closing portion 212 of each of the plural energy storage devices 2, and a second extension portion 47 extending along the Z-axis direction from the first extension portion 46. Further, each of the pair of connecting members 43 has a connected portion 48 extending in the Y-axis direction from each X-axis end portion of the connecting member main body 44, along a surface of the end member 40 facing outward in the X-axis direction.

The connecting member main body 44 has a pair of beam portions 441 spaced apart in the Z-axis direction and each extending in the X-axis direction, a pair of end connection portions 442 each extending in the Z-axis direction and connecting corresponding end portions (facing each other in Z-axis direction) of the pair of beam portions 441, and plural intermediate connection portions 443 each extending in the Z-axis direction and connecting portions of the pair of beam portions 441 that face each other in the Z-axis direction at intermediate positions in the X-axis direction. The plural intermediate connection portions 443 are spaced apart in the X-axis direction. In other words, the connecting member main body 44 is a portion that covers the short wall portions 215 of the plural energy storage devices 2 and is provided with plural windows (openings) penetrating the connecting member main body 44 in the Y-axis direction.

The pair of beam portions 441 include a first beam portion 441A extending along a first corner portion 21A of the case 21 formed of the lid plate 216 and the short wall portion 215 of the energy storage device 2, and a second beam portion 441B extending along a second corner portion 21B of the case 21 formed of the closing portion 212 and the short wall portion 215 of the energy storage device 2 (see FIGS. 4 and 5).

The first beam portion 441A has a first portion 4411 extending in the X-axis direction along the lid plate 216 in the first corner portion 21A of the case 21 of each energy storage device 2, and a second portion 4412 extending in the X-axis direction along the short wall portion 215 in the first corner portion 21A of the case 21 of each energy storage device 2. The cross-sectional shape of the first beam portion 441A along the YZ plane is L-shaped.

The second beam portion 441B extends in the X-axis direction along the short wall portion 215 in the second corner portion 21B of the case 21 of each energy storage device 2.

The first extension portion 46 of the present embodiment extends inward in the Y-axis direction from the other end portion of the connecting member main body 44 in the Z-axis direction (e.g., other end portion of second beam portion 441B in Z-axis direction), and also extends in the X-axis direction (see FIG. 2). Additionally, the first extension portion 46 of the present embodiment extends from the entire area in the X-axis direction of the other end portion of the connecting member main body 44 in the Z-axis direction. Moreover, in the energy storage apparatus 1 of the present embodiment, the first extension portion 46 is provided on each of the pair of connecting members 43 in the Y-axis direction, and the pair of connecting members 43 are provided on both sides of the plural energy storage devices 2 in the Y-axis direction. Hence, the pair of first extension portions 46 cover both end portions (end portions arranged on both outer sides in Y-axis direction) of the closing portions 212 of the energy storage devices 2 in the Y-axis direction (see FIGS. 4 and 5).

The second extension portion 47 extends along the Z-axis direction from at least a part of the first extension portion 46 in the X-axis direction (see FIG. 2). Note that the fact that the second extension portion 47 extends along the Z-axis direction means that the extension direction of the second extension portion 47 includes a component in the Z-axis direction. The second extension portion 47 of the present embodiment extends from the entire area of the first extension portion 46 in the X-axis direction to the other side in the Z-axis direction. Additionally, the second extension portion 47 of the present embodiment includes an inclined portion 470 continuous with the first extension portion 46 and extending along the Z-axis direction while being inclined with respect to the Z-axis direction, and a parallel portion 471 continuous with the inclined portion 470 and extending parallel to the Z-axis direction. The inclined portion 470 of the present embodiment is inclined so that the portion located closer to the other side in the Z-axis direction is located inward in the Y-axis direction (see FIGS. 4 and 5). Additionally, the inclined portion 470 has a flat plate shape. The tip end of the parallel portion 471 of the present embodiment in the Z-axis direction is located inward (on one side) in the Z-axis direction of the tip end of the extension portion 42 of the end member 40 (tip located on other side in Z-axis direction).

The insulator 5 has an insulating property and is arranged between the connecting member 43 and the plural energy storage devices 2 (see FIG. 2). Additionally, a pair of insulators 5 are arranged on both sides of the plural energy storage devices 2 in the Y-axis direction. Each of the pair of insulators 5 is arranged along the plural energy storage devices 2. Moreover, each of the pair of insulators 5 covers at least a region of the connecting member 43 facing the plural energy storage devices 2. Specifically, each insulator 5 has a main body covering portion 50 that covers a surface of the connecting member main body 44 facing the energy storage devices 2, a first covering portion (first portion) 51 that extends along the closing portions 212 of the plural energy storage devices 2 from the main body covering portion 50, and a second covering portion (second portion) 52 extending along the Z-axis direction from the first covering portion 51.

The pair of main body covering portions 50 have a pair of beam portion covering portions 53 for insulating between the pair of beam portions 441 and the energy storage devices 2, a pair of end covering portions 54 for insulating between the pair of end connection portions 442 and the energy storage devices 2, and plural intermediate covering portions 55 for insulating between the plural intermediate connection portions 443 and the energy storage devices 2. Each of the covering portions 53, 54, and 55 has a shape corresponding to the beam portion 441, the end connection portion 442, and the intermediate connection portion 443 of the connecting member 43.

Of the pair of beam portion covering portions 53, a lid plate side covering portion 53A, which is the beam portion covering portion that covers the first beam portion 441A, has a first inner portion 531 that extends inward in the Y-axis direction from a boundary position between the first portion 4411 and the second portion 4412 and also extends in the X-axis direction inside (on energy storage device 2 side of) the first beam portion 441A to cover a surface of the first portion 4411 facing the lid plate 216 side, a second inner portion 532 that extends to one side in the Z-axis direction from the tip end (inner end in Y-axis direction) in the Y-axis direction of the first inner portion 531 and also extends in the X-axis direction to cover a tip end surface of the first portion 4411 in the Y-axis direction, and a third inner portion 533 that extends to the other side in the Z-axis direction from an outer end (boundary position between first portion 4411 and second portion 4412) of the first inner portion 531 in the Y-axis direction and also extends in the X-axis direction to cover a surface of the second portion 4412 facing the short wall portion 215 side. Of the pair of beam portion covering portions 53, a closing portion side covering portion 53B, which is the beam portion covering portion that covers the second beam portion 441B, has a fourth inner portion 534, for example, that extends in the Z-axis direction inside (on energy storage device 2 side of) the second beam portion 441B.

Each of the pair of end covering portions 54 extends in the Z-axis direction and covers a surface of the end connection portion 442 facing the energy storage device 2 side. Each of the plural intermediate covering portions 55 extends in the Z-axis direction and covers a surface of the intermediate connection portion 443 facing the energy storage device 2 side (see FIG. 2).

The first covering portion 51 is a portion that covers a surface of the connecting member 43 facing the closing portions 212 of the energy storage devices 2. Specifically, the first covering portion 51 is a portion that covers a surface of the first extension portion 46 facing the closing portions 212 of the energy storage devices 2. Additionally, the first covering portion 51 is continuous with an end portion of the main body covering portion 50 in the Z-axis direction, and extends along the Y-axis direction. (See FIGS. 2, 4, and 5.) The first covering portion 51 of the present embodiment extends from the entire area in the X-axis direction of the other end portion of the main body covering portion 50 (e.g., fourth inner portion 534) in the Z-axis direction (see FIGS. 4 and 5). Additionally, the first covering portion 51 of the present embodiment covers an end portion of the closing portion 212 of the energy storage device 2 located on the outside in the Y-axis direction. Note that in the energy storage apparatus 1 of the present embodiment, since the first covering portion 51 is provided on each of the pair of insulators 5 in the Y-axis direction, the pair of first covering portions 51 cover both end portions of the closing portion 212 of the energy storage device 2 in the Y-axis direction.

The second covering portion 52 is a portion that covers a surface of the second extension portion 47 facing inward in the Z-axis direction. Additionally, the second covering portion 52 is continuous with an end portion of the first covering portion 51 in the Y-axis direction, and extends along the Z-axis direction. Moreover, the second covering portion 52 extends along the Z-axis direction from at least a part of the first covering portion 51 in the X-axis direction. The second covering portion 52 of the present embodiment extends from the entire area of the first covering portion 51 in the X-axis direction to the other side in the Z-axis direction (see FIG. 2). Additionally, the second covering portion 52 of the present embodiment extends to a position on one side in the Z-axis direction of the tip end (tip end located on other side in Z-axis direction) of the extension portion 42 of the end member 40 (see FIGS. 4 and 5). Moreover, the second covering portion 52 of the present embodiment has an inclined portion 520 continuous with the first covering portion 51 and extending along the Z-axis direction while being inclined with respect to the Z-axis direction, a parallel portion 521 continuous with the inclined portion 520 and extending parallel to the Z-axis direction, and a tip end portion 522 continuous with the parallel portion 521 and extending to both sides in the Y-axis direction. The second covering portion 52 of the present embodiment, together with the installation surface S1 (facing region S2), partitions a guide flow path 38 that guides the fluid to each flow path 35 in the X-axis direction.

The inclined portion 520 covers a surface of the inclined portion 470 of the second extension portion 47 facing one side in the Z-axis direction. The inclined portion 520 of the present embodiment is inclined so that the portion located closer to the other side in the Z-axis direction is located inward in the Y-axis direction. Additionally, the inclined portion 520 has a flat plate shape. The parallel portion 521 covers an inner surface of the parallel portion 471 of the second extension portion 47 in the Y-axis direction. The tip end portion 522 extends from the outer (other side) end edge of the parallel portion 521 in the Z-axis direction. Additionally, the tip end portion 522 covers a tip end surface (e.g., surface facing other side in Z-axis direction) of the parallel portion 471 of the second extension portion 47. Moreover, an end face (tip end face) on the extending side of the tip end portion 522 is a flat surface. The tip end portion 522 of the present embodiment is configured such that, in a state where both ends (pair of end members 40) of the energy storage apparatus 1 in the X-axis direction are fixed to the installation regions S3 with the closing portions 212 of the energy storage devices 2 separated from the facing region S2, the tip end portions 522 are in contact with the facing region S2 (see FIGS. 3 to 5). Note that the tip end portion 522 of the present embodiment indirectly contacts the facing region S2. Specifically, the tip end portion 522 indirectly contacts the facing region S2 with a seal member 8 interposed therebetween. The material of the seal member 8 is softer than the material of the insulator 5, for example.

In the present embodiment, the frame 7 has a first portion formed of the first extension portion 46 of the connecting member 43 and the first covering portion 51 of the insulator 5, and a second portion formed of the second extension portion 47 of the connecting member 43 and the second covering portion 52 of the insulator 5.

In the holding member 4 described above, the extension portion 42 of the end member 40 extends at least to the tip end (tip end portion 522) of the second covering portion 52 of the insulator 5. In the holding member 4 of the present embodiment, the extension portion 42 extends to a position on the other end side in the Z-axis direction of the tip end (tip end portion 522) of the second covering portion 52.

The bus bar 6 is a plate-shaped member having conductivity such as metal (see FIG. 1). The bus bar 6 conducts the external terminals 22 of the energy storage device 2, or the external terminal 22 of the energy storage device 2 and the external input/output terminal 49. Plural (number corresponding to number of plural energy storage devices 2 and number of external input/output terminals 49) bus bars 6 are provided in the energy storage apparatus 1. The plural bus bars 6 of the present embodiment connect (conduct) all of the plural energy storage devices 2 included in the energy storage apparatus 1 in series.

According to the energy storage apparatus 1 described above, when the energy storage apparatus 1 is installed, the second covering portion 52 extends in the Z-axis direction from the first covering portion 51 toward the facing region S2 facing the outer surfaces of the closing portions 212 of the energy storage devices 2 at a distance. Hence, when the energy storage apparatus 1 sags or starts to sag, the second covering portion 52 comes into contact with the facing region S2 to support the energy storage apparatus 1, and reduces sagging of the energy storage apparatus 1. Moreover, in the energy storage apparatus 1 of the present embodiment, since the second covering portion 52 extends from the first covering portion 51 along the Z-axis direction over the entire area in the X-axis direction, the second covering portion 52 supports the energy storage apparatus 1 in a wide range in the X-axis direction. Hence, the energy storage apparatus 1 is less likely to sag. Moreover, according to the energy storage apparatus 1 of the present embodiment, the second extension portion 47 extending along the Z-axis direction is continuous in the entire area in the X-axis direction of the first extension portion 46 extending in the X-axis direction. Hence, rigidity of the frame 7 (e.g., connecting member 43) can also be ensured.

Additionally, in the energy storage apparatus 1 of the present embodiment, since a pair of frames 7 (e.g., insulators 5) are provided so as to be arranged in the Y-axis direction, the second covering portions 52 support the energy storage apparatus 1 at two locations in the Y-axis direction. Hence, it is possible to suppress rattling and shaking of the energy storage apparatus 1 along a plane (YZ plane) orthogonal to the X-axis direction of the energy storage device 2.

Moreover, in the energy storage apparatus 1 of the present embodiment, by fixing the pair of extension portions 42 of the end member 40 to the installation regions S3, both ends of the energy storage apparatus 1 can be fixed to the installation regions S3 with the closing portions 212 of the energy storage devices 2 spaced apart from the facing region S2. That is, without using additional members or the like, the energy storage apparatus 1 alone can be installed (fixed) with the energy storage devices 2 spaced apart from the facing region S2.

In the energy storage apparatus 1 of the present embodiment, the guide flow path 38 is partitioned by the second covering portion 52 of the insulator 5 and the installation surface S1 (facing region S2), and the second covering portion 52 has the inclined portion 520. Hence, the width in the Y-axis direction of the guide flow path 38 is widened on one side in the Z-axis direction by the inclination of the inclined portion 520 (inclination that increases width in Y-axis direction for portion closer to one side in Z-axis direction). As a result, the range of the inlet 35a of the flow path 35 formed between the energy storage device 2 and the adjacent member 3 can be widened in the Y-axis direction.

Additionally, in the energy storage apparatus 1 of the present embodiment, the frame 7 (e.g., tip end portion 522) indirectly contacts the facing region S2 with the seal member 8 interposed therebetween, and the material of the seal member 8 is softer than that of the frame 7 (e.g., insulator 5). Hence, the frame 7 is surely brought into close contact with the facing region S2 even if the surface of the facing region S2 has an uneven shape, the surface of a portion (e.g., tip end portion 522) that indirectly contacts the facing region S2 of the frame 7 has an uneven shape, or the surface of the portion (e.g., tip end portion 522) that indirectly contacts the facing region S2 of the frame 7 is inclined with respect to the surface of the facing region S2.

Note that the energy storage apparatus of the present invention is not limited to the above-described embodiment, and it goes without saying that various changes can be made within the scope of the gist of the present invention. For example, the configuration of one embodiment can be added to the configuration of another embodiment, and a part of the configuration of one embodiment can be replaced with the configuration of another embodiment. Moreover, some of the configurations of certain embodiments can be deleted.

For example, while the frame 7 includes a connecting member 43 formed of a conductive member such as metal and the insulator 5 formed of an insulating member such as resin, the frame 7 may include a conductive frame member and an insulating coating that covers the surface of the frame member. Note that the frame 7 only needs to include at least one of a conductive member and an insulating member.

Additionally, the shape of the frame 7 is not limited to the shape of the above embodiment, and may be any shape as long as it has the first portion that extends in the X-axis direction along the closing portions 212 of the plural energy storage devices 2, and the second portion that extends along the Z-axis direction toward the facing region S2 from at least a part of the first portion in the X-axis direction. Hereinafter, modification examples of the shape of the frame 7 will be described by referring to the frame 7 including a conductive frame member and an insulating coating that covers the surface of the frame member.

Figure 6:
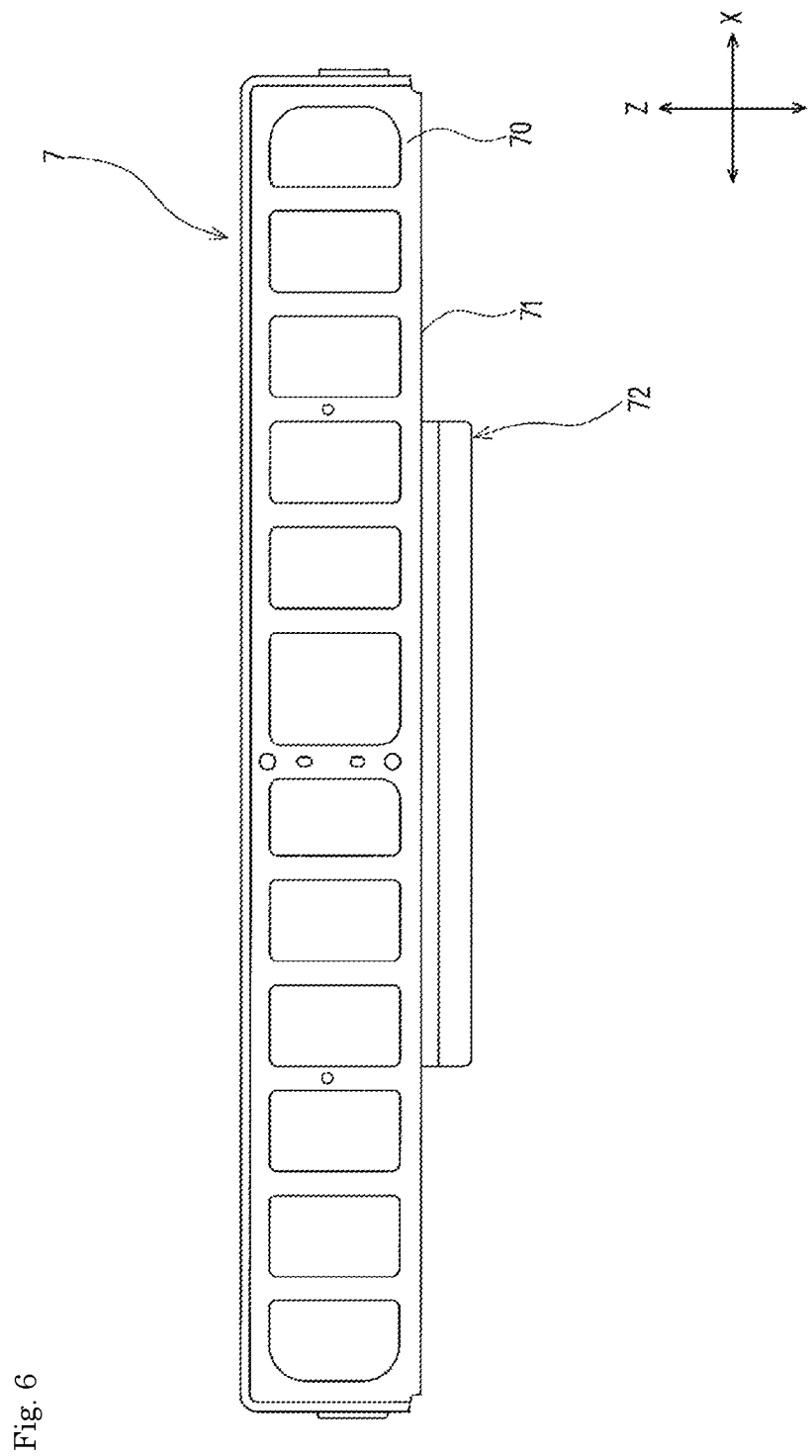
FIG. 6 is a side view of a frame of an energy storage apparatus according to a modification example.

For example, in a frame 7, the second portion may extend from a part of the first portion in the X-axis direction. As shown in FIG. 6, a frame 7 may have a main body portion 70 extending in the X-axis direction along short wall portions 215 of energy storage devices 2, a first portion 71 extending in the X-axis direction along closing portions 212 of the energy storage devices 2, and a second portion 72 extending along the Z-axis direction from a part (e.g., central region in X-axis direction) of the first portion 71 in the X-axis direction. Even if the second portion 72 extends from only a part of the first portion 71 in the X-axis direction, when an energy storage apparatus 1 is installed with the energy storage devices 2 separated from a facing region S2, a second portion 72 extends along the Z-axis direction from a first portion 71 and supports the energy storage apparatus 1 in the central region in the X-axis direction which tends to sag due to being separated from both ends of the energy storage apparatus 1 in the X-axis direction. Hence, sagging of the energy storage apparatus 1 can be reduced reliably.

Figure 7:
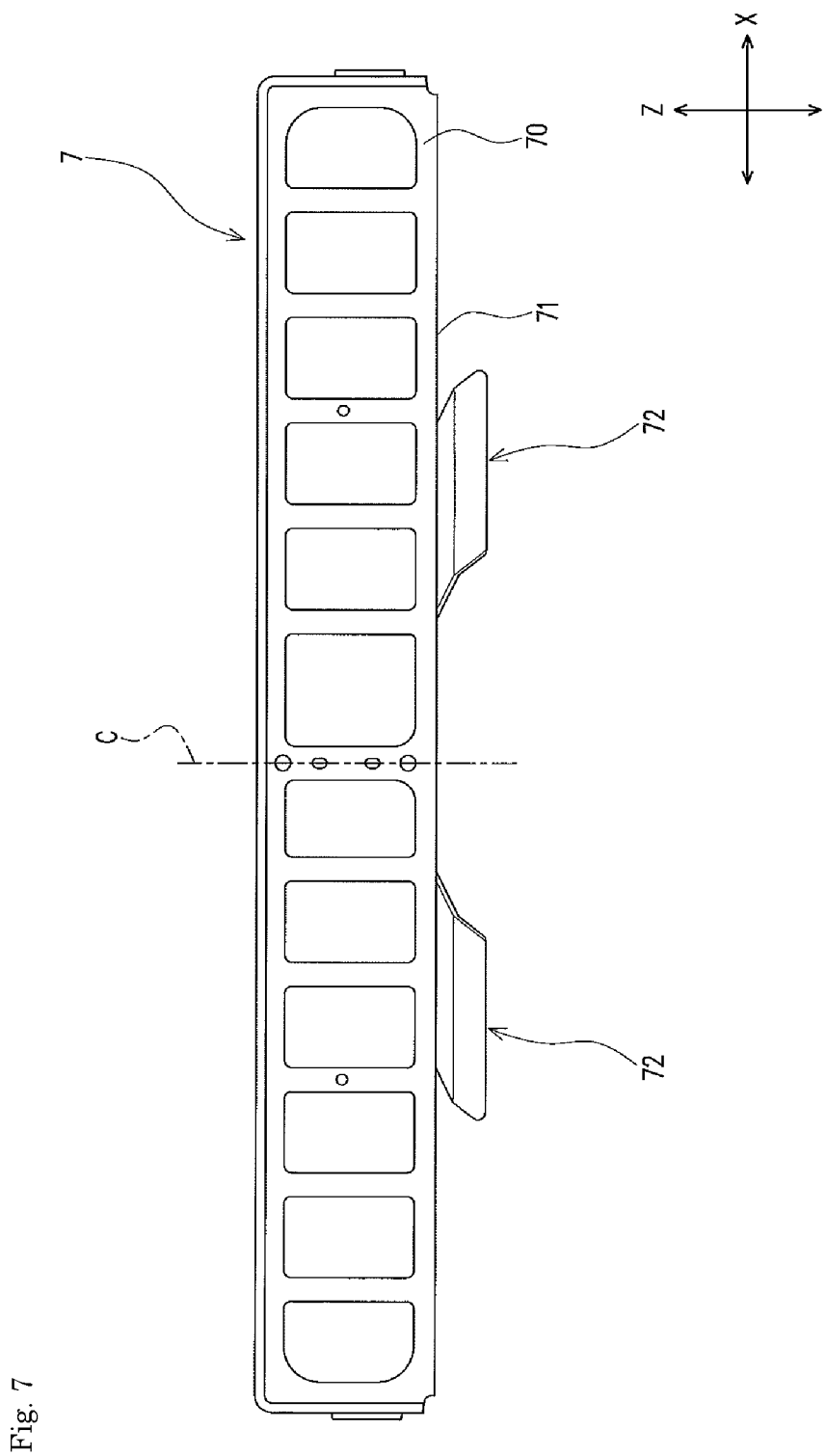
FIG. 7 is a side view of a frame of an energy storage apparatus according to a modification example.
Figure 8:
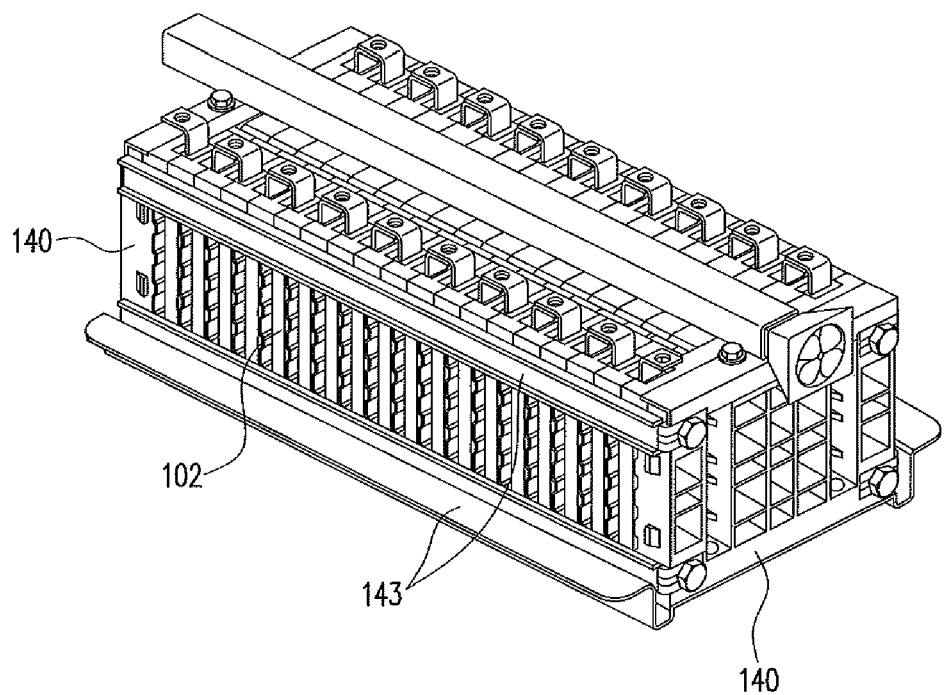
FIG. 8 is a perspective view describing a conventional energy storage apparatus.

Additionally, in the frame 7, the second portion 72 may extend from plural positions of the first portion 71 in the X-axis direction. For example, as shown in FIG. 7, a second portion 72 may extend along the Z-axis direction from plural positions (e.g., two positions) of a first portion 71 in the X-axis direction. A pair of second extension portions 47 may have an identical shape and be arranged substantially symmetrically with respect to a central axis C in the X-axis direction of a main body portion 70. Even if the second portion 72 extends from only parts of the first portion 71 in the X-axis direction, when an energy storage apparatus 1 is installed with energy storage devices 2 separated from a facing region S2, the second portions 72 extend along the Z-axis direction from the first portion 71 and support the energy storage apparatus 1 at plural positions in the X-axis direction. Hence, sagging of the energy storage apparatus 1 can be reduced.

Moreover, the frame 7 does not have to have the main body portion 70. In this case, plural frames 7 formed of a first portion 71 and a second portion 72 may be arranged in the Y-axis direction or arranged in the X-axis direction on the other side in the Z-axis direction with respect to the closing portions 212 of energy storage devices 2.

The second portion 72 may have a stepped shape or a curved shape when viewed in the X-axis direction. Additionally, the second portion 72 may have either an inclined portion or a parallel portion. In a case where the second portion 72 includes only a parallel portion, for example, the second portion 72 may extend parallel to the Z-axis direction from an end portion located inside the first portion 71 in the Y-axis direction.

The shape of the connecting member 43 and the shape of the insulator 5 may correspond to each other (may be substantially the same), or may be different. For example, in the frame 7 of FIGS. 6 and 7, a second covering portion 52 of an insulator 5 may extend to a position on the other side in the Z-axis direction of the tip end of the second extension portion 47 of the connecting member 43 located on the other side in the Z-axis direction. Additionally, the dimension of the connecting member 43 in the Z-axis direction may be shorter than the dimension of the connecting member 43 in the Z-axis direction of the above embodiment. For example, the connecting member 43 may be in the shape of a strip (band shape or long plate shape) arranged so as to cover the short wall portions 215 of the plural energy storage devices 2. In this case, the insulator 5 may have a first covering portion 51 extending in the X-axis direction along the closing portions 212 of the plural energy storage devices 2 and a second covering portion 52 extending along the Z-axis direction toward the facing region S2 from at least a part of the first covering portion 51 in the X-axis direction. That is, in a case where the connecting member 43 has a strip shape or the like, the insulator 5 may form the first portion and the second portion of the frame 7. Note that the dimension of the insulator 5 in the Z-axis direction may be shorter than the dimension of the connecting member 43 in the Z-axis direction. In this case, the connecting member 43 may form the first portion and the second portion of the frame 7. For example, the second extension portion 47 of the connecting member 43 may extend toward the facing region S2 along the Z-axis direction.

In the installed state of the energy storage apparatus 1, the second portion 72 of the frame 7 does not have to be in contact with the facing region S2. In this case, too, when the energy storage apparatus 1 is installed, the second portion 72 extends from the first portion 71 toward the facing region S2, so that the second portion 72 comes into contact with the facing region S2 and supports the energy storage apparatus 1 when the energy storage apparatus 1 sags. Thus, sagging of the energy storage apparatus 1 can be reduced. That is, the energy storage apparatus is less likely to sag.

In the installed state of the energy storage apparatus 1, the frame 7 (tip end portion 522 of insulator 5 of above embodiment) may come into direct contact with the facing region S2. Additionally, both ends of the energy storage apparatus 1 may be fixed to the installation regions S3 by parts other than the end member 40. Moreover, both ends of the energy storage apparatus 1 may be fixed to the installation regions S3 by a fixing member different from the members included in the energy storage apparatus 1. On the installation surface S1, the position of the facing region S2 in the Z-axis direction may be different from the positions of the installation regions S3 in the Z-axis direction. For example, a step may be provided between the facing region S2 and the installation regions S3. Additionally, the installation regions S3 may extend in a direction different from the direction in which the facing region S2 extends. Moreover, the installation regions S3 may be discontinuous with the facing region S2. For example, the facing region S2 may be a horizontal plane (floor surface), and the installation regions S3 may be a wall surface.

The end member 40 may be fixed to the installation regions S3 by a fixing member other than the bolt 421, welding, or the like. Additionally, the number of end members 40 may be just one, or two or three or more. One, or three or more extension portions 42 of the end member 40 may be provided for one end member main body 41. For example, the extension portion 42 may extend from the entire area of the side 41A corresponding to the closing portion 212 of the energy storage device 2 in the end member main body 41. It is sufficient that the extension portion 42 of the end member 40 extend at least to the tip end (e.g., tip end portion 522) in the Z-axis direction of the second covering portion 52 along the Z-axis direction from the end member main body 41.

The space partitioned by the insulator 5 and the installation surface S1 may be used not only as a guide flow path 38 but also as an area for arranging wirings connecting the members forming the energy storage apparatus 1 or connecting the members to the outside.

The number of energy storage devices 2 included in the energy storage apparatus 1 is not limited to more than one, and may be one. In other words, it suffices that at least one energy storage device 2 is included in the energy storage apparatus 1.

DESCRIPTION OF REFERENCE SIGNS

1: Energy storage apparatus
2: Energy storage device
20: Electrode assembly
21: Case
21A: First corner portion
21B: Second corner portion
22: External terminal
211: Case main body
212: Closing portion
213: Body portion
214: Long wall portion
215: Short wall portion
216: Lid plate
217: Gas release valve
3: Adjacent member
315: Bolt
35: Flow path
35a: Inlet (opening)
35b: Outlet (opening)
38: Guide flow path
4: Holding member
40: End member
41: End member main body
41A: Side
42: Extension portion
420: Hole
421: Bolt
43: Connecting member
44: Connecting member main body
441: Beam portion
441A: First beam portion
441B: Second beam portion
4411: First portion
4412: Second portion
442: End connection portion
443: Intermediate connection portion
45: Fixing member
46: First extension portion
47: Second extension portion
470: Inclined portion
471: Parallel portion
48: Connected portion
49: External input/output terminal
5: Insulator
50: Main body covering portion
51: First covering portion (first portion)
52: Second covering portion (second portion)
520: Inclined portion
521: Parallel portion
522: Tip end portion
53: Beam portion covering portion (covering portion)
53A: Lid plate side covering portion
53B: Closing portion side covering portion
531: First inner portion
532: Second inner portion
533: Third inner portion
534: Fourth inner portion
54: End covering portion (covering portion)
55: Intermediate covering portion (covering portion)
6: Bus bar
7: Frame
70: Main body portion
71: First portion
72: Second portion
8: Seal member
102: Battery cell
140: End plate
143: Connecting bar
S1: Installation surface
S2: Facing region
S3: Installation region
C: Central axis

The invention claimed is:

1. An energy storage apparatus comprising:
a plurality of energy storage devices arranged in a first direction; and
a frame arranged along the plurality of energy storage devices, wherein
each of the plurality of energy storage devices includes an electrode terminal, and a case including a first outer surface on which the electrode terminal is disposed, and a second outer surface facing in a second direction orthogonal to the first direction and arranging opposite the first outer surface in the second direction, and
the frame includes:
a first portion extending in the first direction along the second outer surface; and
a second portion extending in the second direction toward a facing surface on which the energy storage apparatus is installed, from at least a part of the first portion.

2. The energy storage apparatus according to claim 1, wherein
the second portion extends toward the facing surface in the second direction from an entire area in the first direction of the first portion.

3. The energy storage apparatus according to claim 1, wherein
a pair of the frames are provided so as to be arranged in a third direction orthogonal to the first direction and the second direction.

4. The energy storage apparatus according to claim 1, further comprising an end member that is outwardly aligned with an energy storage device located at a very end of the plurality of energy storage devices in the first direction, wherein
the end member includes:
a main body portion facing the energy storage device located at the very end when viewed in the first direction, and
an extension portion extending in the second direction to at least a tip end of the second portion from the main body portion.

5. The energy storage apparatus according to claim 1, wherein the frame includes a conductive connecting member and an insulator, and the insulator is arranged between the plurality of energy storage devices and the conductive connecting member.

6. An energy storage apparatus comprising:
a plurality of energy storage devices arranged in a first direction; and
a frame arranged along the plurality of energy storage devices, wherein
each of the plurality of energy storage devices includes an outer surface facing in a second direction orthogonal to the first direction, and the frame includes:
a connecting member and an insulator, the connecting member comprised of a conductive member;
a first portion extending in the first direction along the outer surface; and
a second portion extending in the second direction toward a facing surface on which the energy storage apparatus is installed, from at least a part of the first portion,
wherein the first portion includes a first extension portion of the connecting member extending along the first direction, and a first covering portion of the insulator covering a surface of the first extension portion facing the outer surface,
the second portion includes a second extension portion of the connecting member extending from the first extension portion toward the facing surface, and a second covering portion of the insulator extending from the first covering portion toward the facing surface and along the second extension portion, and
the second covering portion is arranged on a center side of the energy storage device in a third direction orthogonal to each of the first direction and the second direction with respect to the second extension portion.

7. An energy storage apparatus comprising:
a plurality of energy storage devices arranged in a first direction;
a frame arranged along the plurality of energy storage devices; and
an adjacent member arranged between two energy storage devices adjacent to each other in the first direction, or between an energy storage device at a very end in the first direction and a member arranged next to the energy storage device in the first direction, the adjacent member includes a flow path that allow passage of a fluid for adjusting a temperature of the energy storage device between the adjacent energy storage device, wherein
a pair of the frame are arranged both sides of the plurality of energy storage devices in a third direction orthogonal to the first direction and a second direction,
each of the plurality of energy storage devices includes an outer surface facing in the second direction orthogonal to the first direction, and
the frame includes:
a first portion extending in the first direction along the outer surface; and
a second portion extending in the second direction toward a facing surface on which the energy storage apparatus is installed, from at least a part of the first portion,
the second portion of each of the frames defines a guide flow path that guides the fluid to the flow path together with the facing surface.

8. The energy storage apparatus according to claim 1, wherein the case has a flat rectangular parallelepiped shape, the first outer surface is a lid portion, the second outer surface is a bottom portion, the case includes long wall portions and short wall portions, the long wall portions being longer than the short wall portions.

9. The energy storage apparatus according to claim 6, wherein each of the plurality of energy storage devices includes an electrode terminal, and a case having a first outer surface on which the electrode terminal is disposed, and a second outer surface facing in the second direction orthogonal to the first direction and arranging opposite the first outer surface in the second direction.

10. The energy storage apparatus according to claim 9, wherein the case has a flat rectangular parallelepiped shape, the first outer surface is a lid portion, the second outer surface is a bottom portion, the case includes long wall portions and short wall portions, the long wall portions being longer than the short wall portions.

11. The energy storage apparatus according to claim 6, wherein
the second portion extends toward the facing surface in the second direction from an entire area in the first direction of the first portion.

12. The energy storage apparatus according to claim 6, wherein
a pair of the frames are provided so as to be arranged in the third direction orthogonal to the first direction and the second direction.

13. The energy storage apparatus according to claim 6, further comprising an end member that is outwardly aligned with an energy storage device located at a very end of the plurality of energy storage devices in the first direction, wherein
the end member includes:
a main body portion facing the energy storage device located at the very end when viewed in the first direction, and
an extension portion extending in the second direction to at least a tip end of the second portion from the main body portion.

14. The energy storage apparatus according to claim 6, wherein
the insulator is arranged between the plurality of energy storage devices and the conductive member.

15. The energy storage apparatus according to claim 7, wherein each of the plurality of energy storage devices includes an electrode terminal, and a case having a first outer surface on which the electrode terminal is disposed, and a second outer surface facing in the second direction orthogonal to the first direction and arranging opposite the first outer surface in the second direction.

16. The energy storage apparatus according to claim 15, wherein the case has a flat rectangular parallelepiped shape, the first outer surface is a lid portion, the second outer surface is a bottom portion, the case includes long wall portions and short wall portions, the long wall portions being longer than the short wall portions.

17. The energy storage apparatus according to claim 7, wherein
the second portion extends toward the facing surface in the second direction from an entire area in the first direction of the first portion.

18. The energy storage apparatus according to claim 15, wherein
the second portion extends toward the facing surface in the second direction from an entire area in the first direction of the first portion.

19. The energy storage apparatus according to claim 7, further comprising an end member that is outwardly aligned with an energy storage device located at a very end of the plurality of energy storage devices in the first direction, wherein
    the end member includes:
        a main body portion facing the energy storage device located at the very end when viewed in the first direction, and
        an extension portion extending in the second direction to at least a tip end of the second portion from the main body portion.

20. The energy storage apparatus according to claim 7, wherein
    the frame includes a conductive connecting member and an insulator, and
    the insulator is arranged between the plurality of energy storage devices and the conductive connecting member.

* * * * *